Dec. 21, 1948.　　　　　L. M. POTTS　　　　　2,456,733
CIPHER CHECKING SYSTEM
Filed May 27, 1946　　　　　　　　　　　　　　　3 Sheets-Sheet 1

INVENTOR
LOUIS M. POTTS, DECEASED
MARTHA W. C. POTTS, EXECUTRIX

BY Emery Robinson
ATTORNEY

Dec. 21, 1948.  L. M. POTTS  2,456,733
CIPHER CHECKING SYSTEM
Filed May 27, 1946  3 Sheets-Sheet 2

INVENTOR
LOUIS M. POTTS, DECEASED
MARTHA W. C. POTTS, EXECUTRIX
BY
ATTORNEY

Dec. 21, 1948.  L. M. POTTS  2,456,733
CIPHER CHECKING SYSTEM
Filed May 27, 1946  3 Sheets-Sheet 3

INVENTOR
LOUIS M. POTTS, DECEASED
MARTHA W. C. POTTS, EXECUTRIX
BY Emery Robinson
ATTORNEY Patented Dec. 21, 1948

2,456,733

UNITED STATES PATENT OFFICE 2,456,733

CIPHER CHECKING SYSTEM

Louis M. Potts, deceased, late of Evanston, Ill., by Martha W. C. Potts, executrix, Evanston, Ill., assignor to Teletype Corporation, Chicago, Ill., a corporation of Delaware Application May 27, 1946, Serial No. 672,466

3 Claims. (Cl. 178—22)

This invention relates to secret printing telegraph systems and particularly to a cipher checking system for automatically checking the relative positions of key coding devices at intercommunicating stations.

For secret message transmissions in which key coding means are employed for ciphering operations at each terminal of an intercommunicating system as disclosed, for example, in the copending application of L. M. Potts filed October 19, 1942, Serial No. 462,522, now Patent No. 2,403,679, issued July 9, 1946, maintaining the key coding devices located at each terminal of the line in synchronism with each other is essential or garbled messages will be printed at the receiving end of the line. In the patent application referred to above, identically coded key tapes are provided at each end of a signal line for ciphering purposes. In such system, unless the key code tape at the receiving station occupies the same relative position as the identically coded key tape at the transmitting station, the ciphering unit at the receiving station will be incapable of deciphering incoming messages inasmuch as the same signal code permutation afforded by the key tape for the enciphering operation at the transmitting station must also be afforded by the key tape of the receiving station for the deciphering operation.

A principal object of the present invention is the provision of a cipher checking system for determining if the key coding devices of each terminal of an intercommunicating system are operating in phase with each other.

Another object of the invention is the provision of an auxiliary transmitter at the terminals of a telegraph system, each controlled by a ciphering unit for repeating back checking signals to a station of origin.

A further object of the invention is the employment of a signal storage mechanism operable under the control of a ciphering unit for storing checking signals and repeating them back to a station of origin.

A feature of the invention is the provision of a cipher checking system responsive to a special signal code combination for initiating a checking operation and responsive to another special signal code combination at the conclusion of a cipher checking operation to return the cipher checking system to normal condition.

The principal embodiment of the present invention contemplates the use of identical checking equipment including an auxiliary transmitter at each end of a communication line. Each transmitter will be of the conventional cam controlled type commonly employed in start-stop printing telegraphy, similar to the transmitter shown in Patent No. 1,595,472, issued to H. L. Krum, August 10, 1926. Control of a series of transmitter levers of the auxiliary transmitter is accomplished by means of a series of latches which are further under the control of a series of selector code bars of the ciphering unit. To initiate a checking operation, an attendant at a local station, for example, will send to a remote station a shift signal followed by an upper case "J" signal. Upon receipt of the upper case "J" signal, the remote station is conditioned for a checking operation with its keyboard locked up and a signal lamp illuminated, indicating to an attendant at the remote station that a checking operation is taking place. This conditioning signal is not repeated back to the local station since the system precludes such an operation. Furthermore, only the auxiliary transmitter at the receiving end of the line is conditioned for operation. The attendant at the local station may now send one or more checking signals, pausing after the transmission of each signal until the signal is repeated back to the local printer. These checking signals are sent over the line in an enciphered condition by means of the local ciphering unit. Upon receipt of the signals at the remote station the signals are deciphered and printed in plain text and at the same time stored by the auxiliary transmitter. The auxiliary transmitter is subsequently released for operation and the signals are enciphered again in a new signal code permutation afforded by the key tape of the remote ciphering unit which is stepped forward one position each time a signal code combination is transmitted or received. The enciphered signal is received back at the local station where it is deciphered and printed in plain text on the local printer indicating to the local attendant that the respective key tapes are in their correct positions. When it is desired to conclude the cipher checking operation, an upper case "S" signal is transmitted and the cipher checking circuit of the remote station is returned to normal. It is to be understood that if there is an indication that the positions of the key tape of the local and distant station do not correspond, proper steps will be taken to remedy this condition.

A modified form of the invention also provides at each end of the line an auxiliary cam controlled transmitter and, in addition thereto utilizes a special switching means controlled by a cam driven at half the speed of normal transmission. This cam, during the first half of its rotational cycle, places the local printer in circuit for receiving a signal and in its second half of its cycle places the auxiliary transmitter in circuit for a repeating back operation. The auxiliary transmitter is released for operation in both portions of this cycle but is only conditioned in the last half of the cycle for the repeating back operation.

A second modification of the invention features the use of a specially notched transmitting cam coded for the "S" signal code combination which is automatically operated to transmit an enciphered upper case "S" signal back to a station originating a check operation indicating to the attendant thereat that the key tapes are correctly positioned for a ciphering operation. The conditioning of both a local station, or stations originating a checking operation, and a remote station for the transmission back of the upper case "S" signal code combination is accomplished by first sending the shift signal followed by an upper case "J" signal. The conditioning operation effects the illumination of signal lamps at both stations which are later extinguished upon receipt of the upper case "S" signal. It would be good practice to repeat this checking operation several times since there is a possibility that a false upper case "S" signal might be repeated back as it is conceivable that the key tape at the remote station might accidentally present a signal code combination capable of deciphering upper case "J" just at this particular time and still be improperly placed in the ciphering unit. Receipt of the upper case "S" signal by the printer at the remote station through its own local circuit and at the local station over the line is effective to return both cipher checking units to normal and extinguish the signal lamps.

The invention may be more readily comprehended by reference to the following detailed description and the accompanying drawings wherein.

Figure 1:
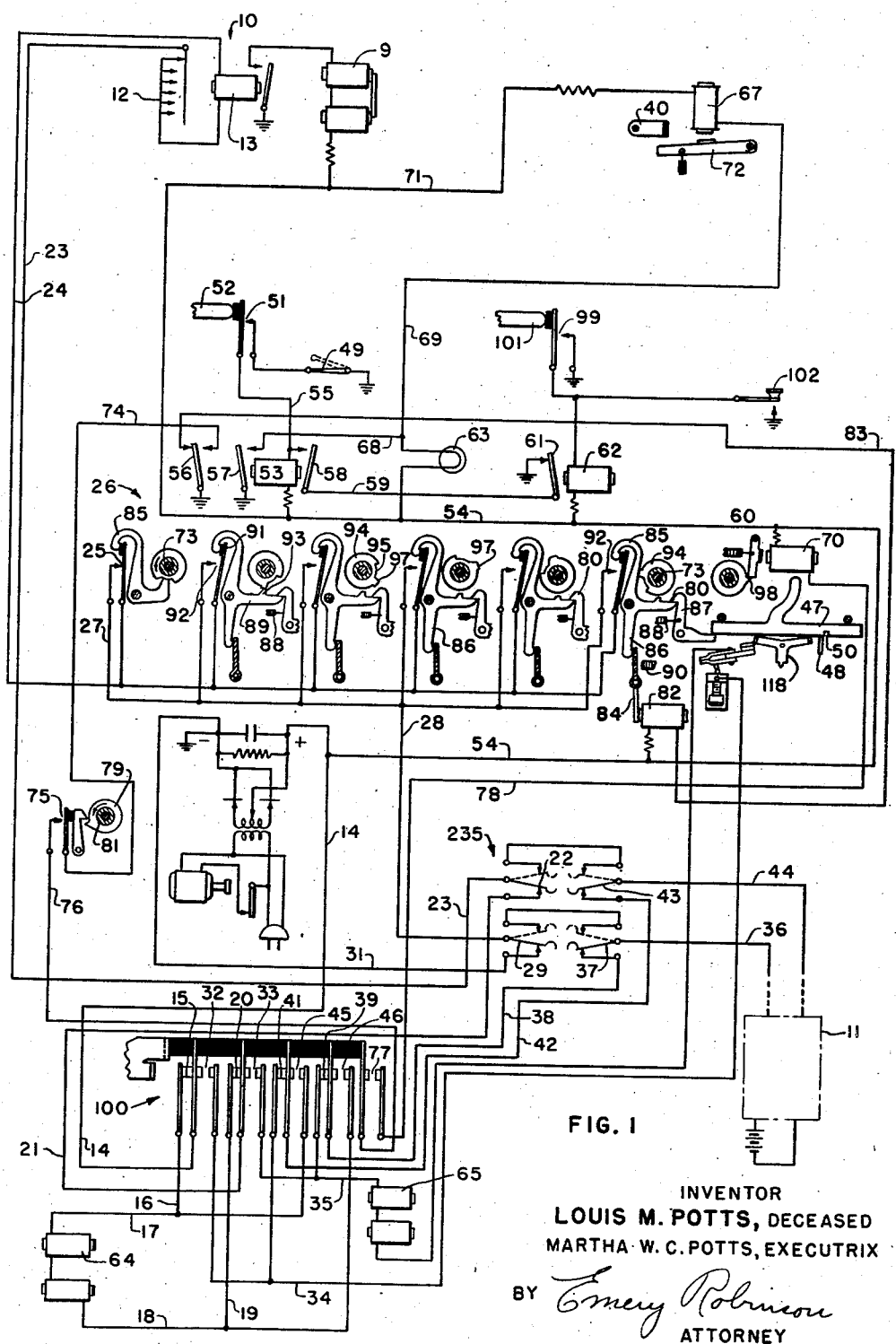
Fig. 1 is a schematic circuit illustration of the principal embodiment of the invention.

With reference now to Fig. 1 of the drawings, a description of the principal embodiment of the invention will proceed. It will be understood that the present invention could be conveniently incorporated into the mechanical ciphering system disclosed in the copending application of L. M. Potts, hereinbefore mentioned and reference thereto should be made for a detailed description of the ciphering system. The direction switch indicated generally as 100 in Fig. 1 is equivalent to the similarly numbered direction switch 100 disclosed in the Potts application. Likewise, switch 235 which, in its upward position, is conditioned for normal transmission and in its lower position for ciphering transmission, is similarly numbered as is the pivoted regenerative repeater contact 118, the selector magnet 64 and the start magnet 65. The ciphering and checking equipment at each terminal of the line are of identical construction and for the purposes of description are presumed to be similarly numbered although no details of the equipment at the distant station are actually shown in the drawing.

When an attendant at the local transmitting station indicated generally as numeral 10 desires to send ciphering signals in accordance with a predetermined arrangement with an attendant at a distant station 11, switch 235 is placed in its downward position which places selector magnet 64 through the direction switch 100, normally in its leftward position, in circuit with the local transmitter 12 and a repeating relay 13 which controls the printer selector magnet 9 over the following circuit: from positive lead 14, through contact pair 15 of the direction switch 100, over conductors 16 and 17, through the winding of selector magnet 64, over conductors 18 and 19, through contact pair 20 of direction switch 100, over conductor 21, through contact 22 of switch 235, over conductor 23 through transmitter 12 and repeating relay 13, over conductor 24, through contact 25 of an auxiliary transmitter indicated generally as 26, over conductors 27 and 28 and through contact 29 of switch 235 to the negative lead 31.

When direction switch 100 is automatically positioned in its rightward or receiving position for receiving an enciphered signal from a distant station 11, start magnet 65 and regenerative repeater contact 118 are taken out of a loop circuit extending from distant station 11 and placed in the circuit just described above. At the same time, selector magnet 64 is removed from the just described circuit and placed in the loop circuit to station 11. With the switch 100 in its rightward or receiving position, conductors 14 and 21 are connected respectively through contact pairs 32 and 33 to conductors 34 and 35 to thereby establish the start magnet 65 and regenerator repeater contact 118 in the local circuit which formerly included selector magnet 64.

The loop circuit mentioned above for start magnet 65 and regenerative repeater contact 118 with direction switch 100 in its leftward or transmitting position is traceable as follows: From distant station 11, over loop line 36, through contact 37 of switch 235, over conductor 38, through contact pair 39 of the direction switch 100, over conductor 35, through the winding of start magnet 65, through regenerative repeater contact 118, over conductor 34, through contact pair 41 of the direction switch 100, over conductor 42 and through contact 43 of switch 235 to the loop line 44 and distant station 11.

When the direction switch 100 is automatically moved to its rightward position for receiving enciphered signals, contact pairs 45 and 46 of the direction switch are closed, thereby placing selector magnet 64 in the loop circuit to distant station 11 just described above, over conductors 17 and 18, respectively. Start magnet 65 and regenerative repeater contact 118 are at this time taken out of the loop circuit when the direction switch 100 is moved to its rightward or receiving position as previously explained and placed in circuit with the local transmitter 12 and receiving relay 13 which controls printing selector magnet 9.

Details of operation of the automatically controlled direction switch 100, fully described in the Potts application referred to above, will not be enumerated, it being sufficient to state that normally direction switch 100 is biased in its leftward or transmitting position, that the receipt of a start signal by the selector magnet 64 indicating a transmitting or enciphering operation is to take place will enable direction switch 100 to remain in its leftward position and that on the other hand, receipt of a start signal from the loop line 36, 44 extending from the remote station 11, by the start magnet 65, indicates that enciphered signals are to be received and direction switch 100 is automatically moved to its rightward or receiving position.

The ciphering unit includes a series of five code bars 47, only one of which is shown in the drawing, and a start bar and stop bar, neither of which is shown. The code bars 47 are under the joint control of a key code tape feeler mechanism not shown which governs the lateral position of the code bars and the selector magnet 64 which through the position of its armature 48 cooperates with the tape feeler mechanism to determine ultimately, by the position of notch 50 of the code bars with respect to the position of the free end of armature 48, whether the code bars 47 will be tilted in a clockwise or a counterclockwise direction as viewed in Fig. 1 to accordingly sequentially operate the regenerative repeater contact 118 to either its spacing or marking position. The start bar is universally operated at the start of a signal code permutation to place the regenerative repeater contact 118 in its spacing or no current position while the stop bar is universally operated at the end of a signal code permutation to place regenerative repeater contact 118 in its marking or current position.

When an attendant at the local station 10 wishes to determine if the position of the key code tape at the remote station 11 corresponds with the position of the key code tape at the local station 10, manual switch 49 will be opened at the local station. The attendant will then send a shift signal to condition the receiver at the remote station 11 for the next following signal to be transmitted, which is the upper case "J" signal. Receipt of the upper case "J" signal at the remote station 11 effects the closure of its contact pair 51 due to the selection of the upper case "J" pull bar 52 thereby energizing conditioning relay 53 over the following circuit: From positive lead 54, through the winding of conditioning relay 53, over conductor 55, through closed contact pair 51, and through manual switch 49 to ground. This causes relay 53 to attract its armatures 56, 57, and 58. Conditioning relay 53 becomes locked up over the following circuit: From positive lead 54, through the winding of relay 53, through the contact of armature 58, over conductor 59, through the contact of armature 61 of relay 62 to ground. Closure of the contact associated with armature 57 of relay 53 provides an obvious circuit for signal lamp 63 which lights up, indicating to the attendant at the remote station that a checking operation is taking place. Operation of armature 57 of relay 53 further provides the following circuit for a keyboard locking relay 67: From ground, through the contact of armature 57, over conductors 68 and 69, through the winding of relay 67, over conductor 71 to positive lead 54. Keyboard locking magnet 67 now attracts its armature 72 which locks the keyboard at the transmitter at the distant station by blocking universal bail 40. It will be remembered that the local station is unaffected by the transmission of the upper case "J" signal since manual switch 49 thereat was opened at the start of the checking operation.

The attraction of the armature 56 of conditioning relay 53 through its front contact prepares a circuit for clutch magnet 70 which controls the rotary movement of a cam sleeve 73 of the auxiliary transmitter 26 in a manner well known in the printing telegraph art, through the expediency of a single revolution clutch. This circuit is established as follows: From ground, through armature 56, over conductor 74, through contact 75 when closed, over conductor 76, through contact pair 77 of direction switch 100 now in its rightward or receiving position, over conductor 78 and through the winding of clutch magnet 70 to positive lead 54. Contact 75 is controlled by a cam 79 mounted on a cam sleeve 81 of the ciphering unit at the remote station, details of which are not shown in the present invention. However, cam sleeve 81 is equivalent to the cam sleeve 41 disclosed in the Potts application mentioned above.

When a checking operation is not taking place, a magnet 82 is normally energized and is effective to block the selection of gooseneck transmitting levers 85 of the auxiliary transmitter 26. Further, since magnet 82 is energized until the upper case "J" signal is received, this signal is not stored at the distant station. The operating circuit for magnet 82 is provided over positive lead 54, through the winding of magnet 82, over conductor 83 and over back contact of armature 56 to ground. Magnet 82, when energized, urges its blocking armature or bail 84 in a counterclockwise direction against the action of spring 90, holding the gooseneck levers 85 at their depending portion 86 from movement during receipt of the upper case "J" signal. After the receipt of upper case "J" signal, the circuit of magnet 82 is broken due to the operation of armature 56 of conditioning relay 53, and the transmitter gooseneck levers 85 are free for further selections as will appear immediately hereinafter.

As selected ones of code bars 47 of the ciphering unit are tilted in a counterclockwise direction to provide a marking impulse by means of regenerative repeater contact 118, associated latches 87, having hooked extensions 80 and normally urged in a counterclockwise direction by springs 88, are now moved in a clockwise direction due to the superior force exerted by associated code bars 47. This frees associated gooseneck levers 85 at their lateral extension 89 for partial pivotal movement in a counterclockwise direction due to the flexure of contact springs 91 of transmitting contacts 92. When this occurs, projections 93 of selected ones of the gooseneck levers 85 rest upon the periphery of associated cams 94 but do not drop into the notches 95 of the cams to permit the closure of contacts 92 at this time. Later in the operation, however, the projections 93 will drop into the notches 95 as cam sleeve 73 is released for rotation, thereby closing selected contacts 92 to send marking impulses to selector magnet 64. After projections 93 fall into notches 95 of the cams 94 during their rotation, they ride upon the high parts 97 of the cam in proper timing to reset latches 87 for receipt of the next signal code combination.

Following the transmission of upper case "J" signal, the local attendant will send one or more checking signals and upon receipt of the first checking signal, repeating relay 13 at the distant station will repeat to printer relay 9 the selected character permutation codes in deciphered form. The incoming signal having been deciphered at this time with direction switch 100 in its rightward or receiving position and the code bars 47 of the ciphering selector operated, the identical code combination repeated through the regenerative repeater contact 118 is also transferred and stored by means of the latches 87 in the auxiliary transmitter 26 as explained above. When the ciphering unit operates during the deciphering of the signal code combination, the cam sleeve 81 thereof is released for a single revolution by a single revolution clutch not shown. Towards the end of its rotational movement, after the incoming signal has been deciphered, cam 79 carried by sleeve 81 is timed to close momentarily contact 75, thereby completing the previously described circuit for clutch magnet 70. Upon energization, clutch magnet 70 attracts its armature 60, thereby withdrawing it from projection 98 of a driven portion of a single revolution clutch, permitting a single revolution of cam sleeve 73 which carries the set of transmitting cams 94 of the auxiliary transmitter 26.

Upon release of cam sleeve 73, the gooseneck lever 85 at the extreme left will invariably open its start-stop transmitting contact 25 to send a start or spacing impulse to selector magnet 64 thereby placing direction switch 100 in its leftward or transmitting position through a circuit provided over conductors 24 and 27, described in detail in an earlier part of the specification. The gooseneck levers 85 selected during the enciphering operation will fall into notches 95 of associated cams 94, closing contacts 92 to send marking or current impulses to selector magnet 64. Unselected gooseneck levers 85 will retain associated contacts 92 in their open position, sending spacing or no current impulses to selector magnet 64. At the end of a single revolution of cam sleeve 73, contact 25 will close in the rest position and will invariably send a marking impulse to selector magnet 64. Since direction switch 100 is in its leftward position during a transmitting operation, contact pair 77 is open, thereby precluding a repeat operation of clutch magnet 70 by breaking its circuit. The resetting of latches 87 through the control afforded by high parts 97 of the transmitting cams 94 is timed so that movement of the code bars 47 in a counterclockwise direction during a repeating back operation is ineffective to cause restorage of the signal by latches 87.

It will now be seen that an enciphered checking signal has been transmitted by the local station 10 to the remote station 11 where the signal was deciphered and enciphered again, due to the fact that the key tape in the ciphering unit is advanced one position for each signal code combination, and repeated back to the local station where it was again deciphered and printed in plain text. The attendant at the local station may send additional checking signals if it is desirable from an operating standpoint to insure the correct position of the key tape. After the checking signal or signals are transmitted, the local attendant will send an upper case "S" signal which results in the closure of contact pair 99 by upper case "S" pull bar 101 at the remote station 11, thereby energizing relay 62 over an obvious circuit, and breaking the locking circuit of the conditioning relay 53 afforded through armature 61 of relay 62, which brings the ciphered checking circuit back to its original condition. At this time, signal lamp 63 is extinguished and keyboard locking lever 72 is released. If the attendant at the remote station desires to communicate with the local station in an emergency while a checking operation is proceeding, a special key 102 is depressed, energizing relay 62 to likewise bring the checking circuit back to normal condition. If there is an indication that the key tape at the remote station is not in the same relative position as the key tape at the local station, proper steps will be taken to place the tapes in phase for future ciphering operations. For instance, a slow to release relay could be placed in the line circuit which would be de-energized upon a complete break of the line circuit to thereby cause the operation of a circuit for a special signal bell or lamp.

The first modification of the invention (Fig. 2) now to be described relies also on reference to the afore-mentioned copending application of L. M. Potts for a detailed description of the ciphering units. Again direction switch 100 is equivalent to the similarly numbered direction switch 100 disclosed in the Potts application. Switch 235 is likewise numbered as is the regenerative repeater contact 118, the selector magnet 64 and the start magnet 65.

The normal transmitting circuit for local station 111, when sending enciphered signals is as follows: From positive lead 110, over conductor 113, through contact pair 114 of direction switch 100, over conductor 115, through selector magnet 64, over conductor 116, through contact pair 117 of direction switch 100, over conductor 228, through contact 119 of switch 235, over conductors 121 and 120, through the back contact of armature 122 of conditioning relay 123, over conductor 124, back through the printer selector magnet 127, through the transmitter 128, over conductor 129 and through contact 131 of switch 235 to negative lead 132. At this time start magnet 65 and regenerative repeater contact 118 are in circuit over a loop line extending to the distant station 112 as follows: From loop line 133 through contact 134 of switch 235, over conductor 135, through contact pair 136 of direction switch 100, over conductor 137, through the winding of start magnet 65, over conductor 138, through regenerative repeater contact 118, over conductors 139 and 141, through contact pair 142 of direction switch 100, over conductor 143 and through contact 144 of switch 235 to the other side of the loop line 145.

Positioning of the direction switch 100 in its rightward or deciphering position for the receipt of a message, closes contact pairs 146 and 147, placing selector magnet 64 in the loop circuit by connecting conductor 115 with conductor 143 and by connecting conductor 116 with conductor 135. The simultaneous closing of contact pairs 148 and 149 of the direction switch 100 connects conductor 113 with conductor 139 and connects conductor 228 with conductor 137, thus placing start magnet 65 and regenerative repeater contact 118 in the previously described circuit with the printing magnet 127.

Figure 2:
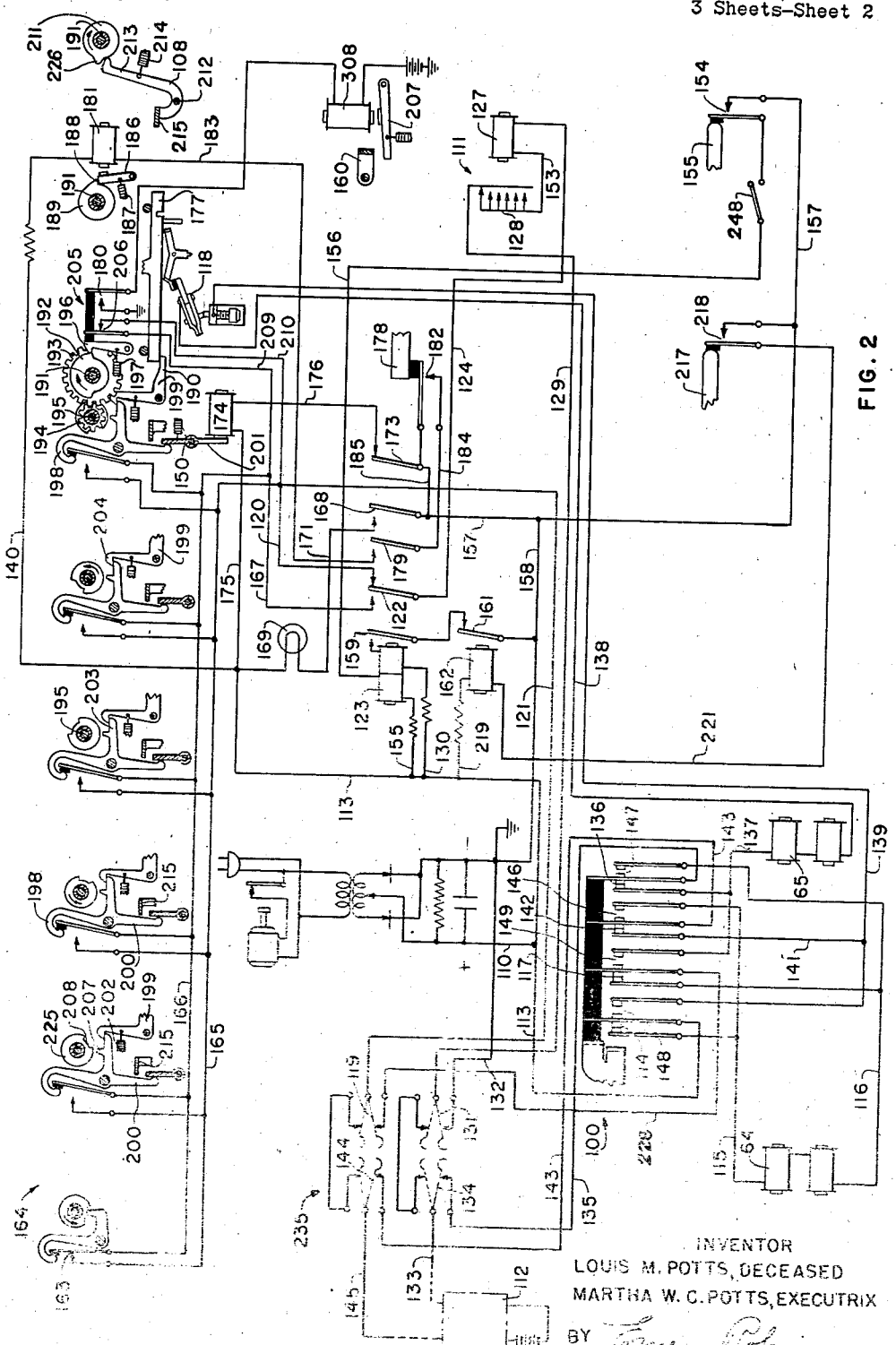
Fig. 2 is a schematic circuit illustration of the first modification of the invention.

Before the description of a typical checking operation is commenced, it will be again presumed as in the principal embodiment of the invention that the local and remote stations are equipped with identical ciphering and checking units and that the numerals used in the description are identical for both stations despite the fact that only the equipment at the local station is actually disclosed in Fig. 2.

When the attendant at local station 112 desires to check the relative positions of the key tapes at the local and remote stations, the manual switch 248 is opened breaking a circuit extending through contact pair 154 controlled by upper case "J" pull bar 155. This will prevent conditioning of the checking system at the local station as will immediately hereafter be evident since it is not desired that the station originating the checking operation be conditioned.

The local attendant will now send a shift signal to the remote station 112 followed by an upper case "J" signal and since the circuit through contact pair 154 is open at this time, the upper case "J" signal will have no conditioning effect at the local station. At the remote station 112, however, the receipt of the upper case "J" signal will cause the selection of upper case "J" pull bar 155 and closure of contact pair 154 which provides a circuit for the energization of conditioning relay 123 as follows: From positive lead 110, over conductors 113 and 155, through the rear winding of conditioning relay 123, over conductor 156, through closed switch 148, through closed contact pair 154, and over conductor 157 to negative lead 158. Attraction of armature 159 by conditioning relay 123 provides a locking circuit therefor as follows: From positive lead 110, over conductors 113 and 130, through the front winding of conditioning relay 123, through closed contact of armature 159, through the contact of armature 161 of relay 162 to negative lead 158.

As armature 122 of conditioning relay 123 moves from its back contact to its front contact, it breaks the previously-described circuit for the transmitter 128 and places it in a circuit traceable through a normally closed start-stop contact 163 of an auxiliary transmitter indicated generally as 164 as follows: From the previous transmitting circuit extending over conductor 121, over conductor 165, through closed contact 163, over conductors 166 and 167, through the front contact of armature 122 and over conductor 124 to the previously described circuit extending to conductor 129.

Attraction of armature 168 by conditioning relay 123 closes a circuit for lighting a signal lamp 169 to indicate to the attendant at the remote station 112 that a checking operation is taking place, as follows: From positive lead 110, over conductor 113, through signal lamp 169, over conductor 157, through closed contact of armature 168 and over conductor 172 to negative lead 158.

As armature 173 of relay 123 moves from its associated contact it breaks a circuit for normally energized relay 174 which formerly was as follows: From positive lead 110, over conductor 113, over conductor 175, through the winding of relay 174, over conductor 176, through previously closed contact 173, and over conductors 185 and 157 to negative lead 158. The purpose of relay 174 similar to the relay 82 described in the principal embodiment of the invention, is to prevent operation of transmitting gooseneck levers 198 of the auxiliary transmitter 164 during normal ciphering operations.

The ciphering unit at the remote station responds to receipt of the incoming signals and through the operation of a series of five code bars 177 sequentially moves regenerative repeater contact 118 to either its marking or spacing position as described in the principal embodiment of the invention in connection with code bars 47. The ciphering unit also includes a universally operated start bar 178 and a stop bar not shown. When conditioning relay 123 was energized, armature 179 was pulled up preparing a circuit for a clutch magnet 181 which, by means of a single revolution clutch, full details of which are not shown, controls the operation of auxiliary transmitter 164. This circuit will extend through contact 182 which is closed upon operation of the start bar 178 over the following circuit: from positive lead 110, over the conductors 113 and 140, through the winding of relay 181, over conductor 183, through closed contact 179, over conductor 184, through contact 182 when closed, and over conductors 185 and 157 to negative lead 158.

The single revolution clutch controlled by clutch magnet 181 is normally restrained from operation by armature lever 186 which is biased in a counterclockwise direction by a spring 187 and which engages at its outer end projection 188 of cam 189 fixedly secured to a driven cam sleeve 191 of the clutch assembly. Also carried by sleeve 191 is a switching cam 192 and a gear 193. Meshing with gear 193 is a relatively smaller gear 194 which is driven at a two to one ratio so that a shaft 195 secured thereto makes two revolutions for a single revolution of the sleeve 191. The periphery of switching cam 192 is designed to have approximately half of its follower surface present a high portion and the other half of its follower surface present a low portion to a switch follower 196 which is urged into contact with the periphery of the cam by means of a spring 197.

During receipt and deciphering of the upper case "J" signal by the remote station, selected ones of the code bars 177 unlatch transmitting gooseneck levers 198 due to the tilting of latches 199 in a clockwise direction, while unselected gooseneck levers 198 remain latched up, depending upon the particular signal code combination being deciphered. However, normally magnet 174 remains energized and through the engagement of blocking armature or bail 201 with the depending portion 200 of the gooseneck levers prevents operation and thus blocks the storage of the upper case "J" signal at the distant station. Latches 199 are normally urged in a counterclockwise direction by springs 202 and include lateral extensions 190 engaging the edges of the selector code bars 177. The vertical portion of the latches include a hooked portion 204 which engages the lateral portion 203 of the levers 198. As stated before, during the receipt of incoming upper case "J" signal, the latches 199 are ineffective to cause the storage of the incoming signal. However, further signals may be stored due to the subsequent de-energization of magnet 174 and release of blocking armature 201 by spring 150.

After start bar 178 is operated on receipt of the first checking signal code combination which is now sent from the local station contact 182 closes and is effective to complete the circuit for the energization of the clutch magnet 181. Energization of magnet 181 removes the armature 186 from the path of the projection 188 of cam 189 and thereby releases cam shaft 195 for two revolutions, through releasing sleeve 191 for one revolution. During the first half revolution of switching cam 192, the transmitting contacts 163 of the auxiliary transmitter are shunted out of the transmitting circuit due to the closure of contact 206 of switch 205 which is connected to conductors 209 and 210. However, during the second half revolution of cam 192, cam follower 196 follows the low part of the cam, opening contacts 206 and placing the auxiliary transmitter 164 in circuit as follows: from the transmitting circuit previously extending over conductor 121, over conductor 165, through transmitting contact 163, over conductors 166 and 167, and through the front contact of armature 122 of conditioning relay 123. The auxiliary transmitter 164 is thus placed in series with the transmitter 128 over the conductor 124. As switch 205 moves to its leftward position and closes contact 180, it further causes the provision of an obvious circuit for keyboard locking magnet 308 for locking the keyboard by means of armature lever 207 which now blocks universal bail 160 to prevent its operation by the attendant at the remote station during a checking operation.

Since magnet 174 remains energized as explained and since clutch magnet 181 is not energized until the first checking signal following upper case "J," through closure of contact pair 182 by start bar 178, shaft 195 of transmitter 164 is released for the first time upon receipt of the first actual checking signal. Selected gooseneck levers 198 through operation of certain selected code bars 177 at their projections 207 fall into notches 208 of associated transmitting cams 225 as they rotate in the conventional manner. Although shaft 195 is released, transmission of the checking signals does not take place until its second revolution with contact pair 206 opened by switch 205. The local operator can thus send additional checking signals pausing each time until a particular signal is repeated back. After the transmission of upper case "J" by the local operator it would be good practice to pause momentarily to insure that the distant station is conditioned before sending the first checking signal. These signals will be deciphered at the distant station and again enciphered and repeated back as contact 206 of switch 205 is opened at the commencement of the second revolution of cam shaft 195 when the auxiliary transmitter 164 is placed in the transmitting circuit.

For the resetting of levers 198 to normal position held by the latches 199 a bail 108 is provided, operable by high part 209 of a cam 211 carried by the driven sleeve 191 which also carries the cam 192 and gear 193. This operation will be properly timed near the end of a single revolution of cam 211 or two revolutions of cam shaft 195. Bail 108 is pivoted on rod 212 and its arm 213 is urged into contact with the periphery of cam 211 by spring 214 and as arm 213 engages the high part 226 of the cam 211 the lateral extension 215 of bail 108 engages the depending portions 200 of selected gooseneck levers 198 to move them a sufficient distance in a clockwise direction to become latched up once more by the latches 199.

After the checking operation is completed, the local attendant will send an upper case "S" signal which causes the upper case "S" pull bar 217 to be selected at the distant station which closes contact 218 thereby establishing an energizing circuit for relay 162 as follows: from positive lead 110 over conductors 113 and 219, through the winding of relay 162, over conductor 221, through closed contact 218 and over conductor 157 to negative lead 158.

As a result, armature 161 is attracted by relay 162 breaking the locking circuit for relay 123 and the cipher checking circuit is returned to normal condition with lamp 169 extinguished, magnet 174 energized and keyboard locking lever 207 released. In the event that there is indication of the improper positioning of the key tapes, steps will be taken to place the tapes in their proper position for further ciphering operation.

Figure 3:
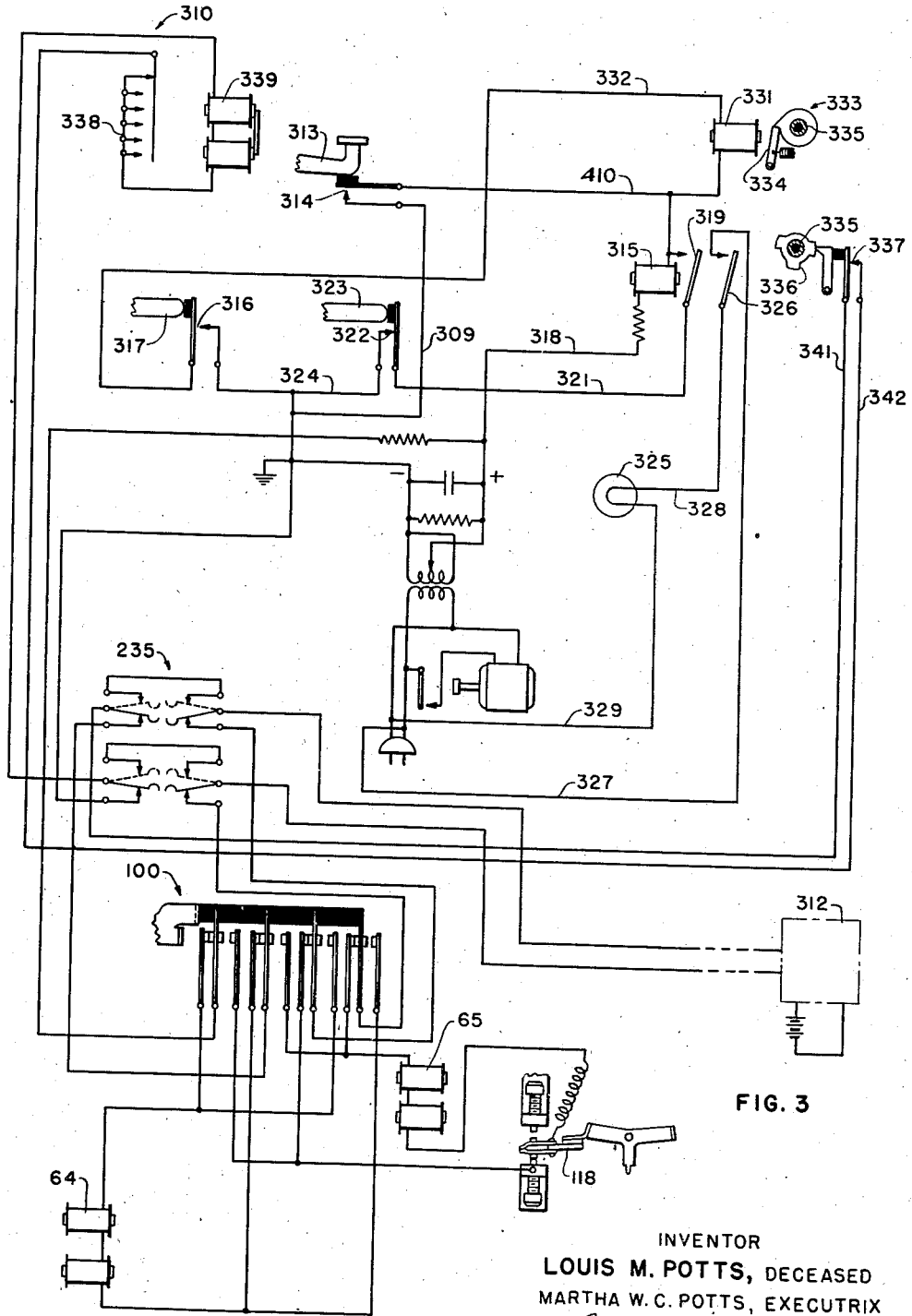
Fig. 3 is a schematic circuit illustration of the second modification of the invention.

The second modification of the invention is shown in Fig. 3 and also relies upon the aforementioned Potts application to supply details of the cipher system. Direction switch 100, switch 235, selector magnet 64, start magnet 65 and a regenerative repeater contact 118 are numbered similarly to like parts in the Potts application. It is further understood that in this modification identical cipher checking equipment is provided at each end of the line similarly numbered, although only the cipher system at the local station is completely shown.

In this embodiment of the invention, when the local attendant desires to check the relative position of the key tape at the local station 310 with the position of the identical key tape of distant station 312, a shift signal is first transmitted. The upper case "J" key 313 is next depressed closing contact 314 and causing the immediate energization of relay 315 at the local station prior to the closure of contact 316 by the upper case "J" pull bar 317 as follows: From positive lead 318, through the winding of relay 315, over conductor 410 and through closed contact 314 to negative lead 309. Relay 315 now becomes locked up over the following circuit: From positive lead 318, through the winding of relay 315, through closed contact of armature 319, over conductor 321 and through normally closed contact 322 controlled by upper case "S" pull bar 323 to negative lead 324. At the same time a signal lamp 325, warning the distant operator of a checking operation, is lighted due to the attraction of armature 326 by relay 315 by means of current flowing over the following path: From power lead 327, through the contact of armature 326, over conductor 328 and through signal lamp 325 to power lead 329. Subsequent closure of contact 316 by the upper case "J" pull bar 317 at the local station is ineffective to energize clutch magnet 331 over conductor 332, due to the negative condition of the circuit at armature 319 of relay 315.

However, at the distant station, key 313 will not be operated and contacts 314 will therefore not close. Thus, when the upper case "J" pull bar 317 is selected, an energizing circuit is made both for clutch magnet 331 and for relay 315 over the following path: from positive lead 318, through the windings of relay 315 and clutch magnet 331, over conductor 332 and through closed contacts 316 to negative lead 324. Relay 315 is locked up and signal lamp 325 is lighted at the distant station in the same manner as at the local station.

Energization of clutch magnet 331 at the distant station 312 causes the operation of a conventional single revolution clutch indicated generally at 333, due to the attraction of armature 334 by the clutch magnet 331. Mounted on the driven sleeve 335 of the clutch is a coded transmitting cam disc 336, specially notched in the "S" signal code combination which is Nos. 1 and 3 impulses marking, and Nos. 2, 4, and 5 impulses spacing. Release of driven sleeve 335 for a single revolution causes therefore the operation of the transmitting cam disc 336 in accordance with the "S" signal code combination to make and break the circuit controlled by transmitting contact 337. Transmitting contact 337 is in circuit with the transmitter 338 at the distant station 312 over conductors 341 and 342. The transmitting and receiving circuit of the ciphering system and operation of direction switch 100 have been fully explained in the principal and first modification of the present invention.

When the upper case "S" signal is received locally by the printer magnet 339 in plain text at the distant station, upper case "S" pull bar 323 will be selected and will open the contacts 322. This will return the distant station to normal by breaking the locking circuit of relay 315, thereby extinguishing signal lamp 325 thereat. At the same time the "S" signal is enciphered by the ciphering unit and transmitted through operation of regenerative repeater contact 118 to the local station 310. Receipt of the enciphered upper case "S" signal and its deciphering at the local station 310 causes the selection of its upper case "S" pull bar 323 and opening of its contact 322 to return the local station to normal as was done at the distant station. This is due to the breaking of the locking circuit for relay 315 which extinguishes signal lamp 325, indicating to the local operator that the key tapes at both places are synchronized. In case the key tape at the distant station was accidentally in a position to correctly encipher the upper case "J" signal, repeat checking operations may be made to verify the correct position of key tape.

Although it is conceivable that in the principal and modified forms of the invention the cipher checking system may be successfully operated with a checking unit at one line terminal only, cipher checking units have been disclosed at both terminals. In the description particular signal code combinations have been used only for the purposes of illustrating the invention and obviously other signal code combinations could be used. Various changes and modifications may be made in the present invention without departing from the spirit or scope thereof.

What is claimed is:

1. In a secret message transmission system, the combination of a first station, a second station, a communication channel associating said stations, means at said first station for selecting variable code combinations of impulses for transmission over said channel, ciphering means operating step by step in accordance with the operation of said selecting means to encipher said selected code combinations, means at said second station for receiving successive enciphered code combinations, deciphering means operative step by step in accordance with the operation of said receiving means to decipher said received code combinations, and means for checking whether the ciphering and deciphering means are in phase comprising a transmitter at said second station inoperative during normal transmission and reception, means responsive to a special code combination transmitted by said first station, enciphered by said ciphering means, received at said second station, and deciphered by said deciphering means to condition said transmitter for operation, means operated by a subsequent enciphered code combination transmitted from said first station and deciphered at said second station for storing the deciphered code combination in the conditioned transmitter and for causing said transmitter to transmit the deciphered code combination enciphered by said deciphering means to said first station to be deciphered thereat by said ciphering means, whereby the proper reception of said code combination is indicative of the proper phase relationship between said ciphering and deciphering means, and means operative by another code combination to restore said transmitter to normal inoperative condition.

2. In a secret message transmission system, the combination of a first station, a second station, a communication channel associating said stations, means at said first station for selecting variable code combinations of impulses for transmission over said channel, ciphering means operating step by step in accordance with the operation of said selecting means to encipher said selected code combinations, means at said second station for receiving successive enciphered code combinations, deciphering means operative step by step in accordance with the operation of said receiving means to decipher said received code combinations, and means for checking whether the ciphering and deciphering means are in phase comprising a transmitter at said second station inoperative during normal transmission and reception, means responsive to a special code combination transmitted by said first station, enciphered by said ciphering means, received at said second station, and deciphered by said deciphering means to condition said transmitter for operation, means operable upon the conditionment of said transmitter for enabling said transmitter to transmit a deciphered code combination enciphered by said deciphering means to said first station to be deciphered thereat by said ciphering means, whereby the proper reception of said last mentioned code combination at the first station is indicative of the proper phase relationship between said ciphering and deciphering means, and means operative to restore said transmitter to normal inoperative condition.

3. In a secret message transmission system, the combination of a first station, a second station, a communication channel associating said stations, means at said first station for selecting variable code combinations of impulses for transmission over said channel, ciphering means operating step by step in accordance with the operation of said selecting means to encipher said selected code combinations, means at said second station for receiving successive enciphered code combinations, deciphering means operative step by step in accordance with the operation of said receiving means to decipher said received code combinations, and means for checking whether the ciphering and deciphering means are in phase comprising a transmitter at said second station inoperative during normal transmission and reception, means responsive to a special code combination transmitted by said first station, enciphered by said ciphering means, received at said second station, and deciphered by said deciphering means to condition said transmitter for operation, and means operable upon the conditionment of said transmitter to cause said transmitter to automatically transmit a deciphered code combination enciphered by said deciphering means to said first station to be deciphered thereat by said ciphering means, whereby the proper reception of said last mentioned code combination at the first station is indicative of the proper phase relationship between said ciphering and deciphering means, said transmitter being automatically deconditioned and returned to normal inoperative condition upon the transmission of said last mentioned code combination.

MARTHA W. C. POTTS,
*Executrix Under the Last Will and Testament of Louis M. Potts, Deceased.*

REFERENCES CITED

The following references are of record in the file of this patent:

UNITED STATES PATENTS

| Number | Name | Date |
|---|---|---|
| 1,310,719 | Vernam | July 22, 1919 |
| 2,003,325 | Watson | June 4, 1935 |
| 2,281,745 | Buckingham | May 5, 1942 |
| 2,354,534 | Mason | July 25, 1944 |
| 2,405,571 | Fitch et al. | Aug. 13, 1946 |